(12) United States Patent
Zhou et al.

(10) Patent No.: US 12,156,047 B2
(45) Date of Patent: *Nov. 26, 2024

(54) METHOD AND APPARATUS FOR MONITORING PDCCH, AND BASE STATION AND USER EQUIPMENT

(71) Applicant: SPREADTRUM COMMUNICATIONS (SHANGHAI) CO., LTD., Shanghai (CN)

(72) Inventors: Huayu Zhou, Shanghai (CN); Shaofei Wang, Shanghai (CN); Yuting Tao, Shanghai (CN)

(73) Assignee: SPREADTRUM COMMUNICATIONS (SHANGHAI) CO., LTD., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,732

(22) Filed: May 8, 2023

(65) Prior Publication Data
US 2023/0276268 A1 Aug. 31, 2023

Related U.S. Application Data

(63) Continuation of application No. 17/042,626, filed as application No. PCT/CN2019/081408 on Apr. 4, 2019, now Pat. No. 11,683,701.

(30) Foreign Application Priority Data

Apr. 4, 2018 (CN) .......................... 201810299535.1

(51) Int. Cl.
*H04W 24/02* (2009.01)
*H04L 5/00* (2006.01)
(Continued)

(52) U.S. Cl.
CPC .......... *H04W 24/02* (2013.01); *H04L 5/0048* (2013.01); *H04L 41/0803* (2013.01);
(Continued)

(58) Field of Classification Search
CPC ............. H04W 24/02; H04W 72/1289; H04W 72/0446; H04W 74/002; H04W 84/022;
(Continued)

(56) References Cited

U.S. PATENT DOCUMENTS 5,852,630 A * 12/1998 Langberg ............ H04L 27/2647
375/219
10,038,529 B2 * 7/2018 Wang ................... H04J 11/0073
(Continued)

FOREIGN PATENT DOCUMENTS

CN 101296508 A 10/2008
CN 101478808 A 7/2009
(Continued)

OTHER PUBLICATIONS

International Search Report for International Application No. PCT/CN2019/081408; Date of Mailing, Jun. 21, 2019.
(Continued)

*Primary Examiner* — Siu M Lee
(74) *Attorney, Agent, or Firm* — CANTOR COLBURN LLP

(57) ABSTRACT

Provided are a method and apparatus for monitoring a PDCCH, and a base station and a user equipment. On a base station side, the method comprises: configuring an association relationship between a notification signal or signaling and a PDCCH; and sending the notification signal or signaling associated with the PDCCH to a user equipment to notify the user equipment to start monitoring the PDCCH. On a user equipment side, the method comprises: receiving a notification signal or signaling which is associated with a
(Continued)

PDCCH and sent by a base station; and starting to monitor the PDCCH according to the notification signal or signaling associated with the PDCCH. By means of the present invention, the signaling overhead and the power consumption of a user equipment can be reduced.

18 Claims, 4 Drawing Sheets

(51) Int. Cl.
    *H04L 41/0803*     (2022.01)
    *H04W 72/23*     (2023.01)
    *H04W 72/0446*     (2023.01)
    *H04W 74/00*     (2009.01)
    *H04W 84/02*     (2009.01)

(52) U.S. Cl.
    CPC ........ *H04W 72/23* (2023.01); *H04W 72/0446* (2013.01); *H04W 74/002* (2013.01); *H04W 84/022* (2013.01)

(58) Field of Classification Search
    CPC .............. H04W 52/02; H04W 52/0225; H04L 41/0803; H04L 5/0048; H04L 5/0091; H04L 5/0078; H04L 5/0053; H04L 5/0005; Y02D 30/70
    See application file for complete search history.

(56) References Cited

U.S. PATENT DOCUMENTS

| | | | |
|---|---|---|---|
| 11,683,701 B2* | 6/2023 | Zhou | H04L 5/0048 455/450 |
| 2010/0110897 A1 | 5/2010 | Chun et al. | |
| 2011/0086608 A1 | 4/2011 | Yamagishi et al. | |
| 2012/0033627 A1 | 2/2012 | Li et al. | |
| 2012/0207103 A1 | 8/2012 | Dai et al. | |
| 2013/0183987 A1* | 7/2013 | Vrzic | H04L 5/0053 455/450 |
| 2013/0279390 A1 | 10/2013 | Ohta et al. | |
| 2013/0336301 A1* | 12/2013 | Deng | H04W 72/23 370/336 |
| 2014/0036828 A1 | 2/2014 | Papasakellariou et al. | |
| 2014/0146720 A1* | 5/2014 | Tang | H04W 72/23 370/280 |
| 2015/0009939 A1* | 1/2015 | Zhang | H04L 5/0037 370/329 |
| 2015/0016361 A1* | 1/2015 | Kim | H04L 1/0041 370/329 |
| 2015/0282208 A1* | 10/2015 | Yi | H04W 72/23 370/329 |
| 2015/0304999 A1 | 10/2015 | Rune | |
| 2016/0219622 A1* | 7/2016 | Liu | H04W 74/008 |
| 2016/0234706 A1 | 8/2016 | Liu et al. | |
| 2017/0064561 A1 | 3/2017 | Tomeba et al. | |
| 2018/0139735 A1* | 5/2018 | Akkarakaran | H04L 5/0053 |
| 2018/0302810 A1 | 10/2018 | Fujishiro | |
| 2018/0337757 A1* | 11/2018 | Noh | H04L 27/26 |
| 2019/0045525 A1 | 2/2019 | Shi et al. | |
| 2019/0045532 A1 | 2/2019 | Zhu et al. | |
| 2019/0223162 A1 | 7/2019 | Suzuki et al. | |
| 2019/0350049 A1* | 11/2019 | Miao | H04W 80/08 |
| 2020/0144641 A1 | 5/2020 | Song et al. | |
| 2020/0169956 A1 | 5/2020 | Sun et al. | |
| 2020/0236732 A1* | 7/2020 | Liu | H04W 72/0446 |
| 2021/0076361 A1 | 3/2021 | Takeda et al. | |
| 2021/0105630 A1* | 4/2021 | Ishikura | H04L 5/0048 |
| 2021/0144641 A1* | 5/2021 | Sun | H04W 84/04 |
| 2021/0212032 A1* | 7/2021 | Lee | H04L 5/0048 |
| 2021/0250917 A1 | 8/2021 | Takeda et al. | |
| 2021/0368453 A1 | 11/2021 | Lee et al. | |

FOREIGN PATENT DOCUMENTS

| | | |
|---|---|---|
| CN | 102655666 A | 9/2012 |
| CN | 104767592 A | 7/2015 |
| CN | 104955106 A | 9/2015 |
| CN | 105722239 A | 6/2016 |

OTHER PUBLICATIONS

USPTO Final Office Action corresponding to U.S. Appl. No. 17/042,626, Dated on Jun. 8, 2022.
USPTO Non-Final Office Action for corresponding U.S. Appl. No. 17/042,626 Dated on Jan. 5, 2022.
USPTO Non-Final Office Action for corresponding U.S. Appl. No. 17/042,626 Dated on Jul. 22, 2021.
USPTO Non-Final Office Action for corresponding U.S. Appl. No. 17/042,626 Dated on Sep. 30, 2022.

* cited by examiner

METHOD AND APPARATUS FOR MONITORING PDCCH, AND BASE STATION AND USER EQUIPMENT

CROSS-REFERENCE TO RELATED APPLICATIONS

The present application is a continuation application of U.S. patent application Ser. No. 17/042,626, filed on Sep. 28, 2020, the entire contents of which are incorporated herein by reference and priority to which is hereby claimed. Application Ser. No. 17/042,626 is the U.S. National stage of application No. PCT/CN2019/081408, filed Apr. 4, 2019. Priority under 35 U.S.C. § 119(a) and 35 U.S.C. § 365(b) is hereby claimed from Chinese Application No. 201810299535.1, filed Apr. 4, 2018, the disclosures of which are both also incorporated herein by reference.

TECHNICAL FIELD

The present disclosure generally relates to wireless communication technology field, and more particularly, to a method and an apparatus for monitoring PDCCH, a base station and a user equipment.

BACKGROUND

In a 5G New Radio (NR) system, a user equipment needs to monitor a Physical Downlink Control Channel (PDCCH) to acquire schedule information. Timing for monitoring the PDCCH configured by a base station for a user equipment may be based on slot, which means monitoring is conducted periodically with a slot as an interval; it may also be based on non-slot or mini-slot, which means monitoring is conducted periodically with a non-slot or mini-slot as an interval.

In an unlicensed band, a user equipment also needs to monitor the PDCCH. In an unlicensed band, a base station needs to do Listen Before Talk (LBT) to acquire a chance to transmit the PDCCH, where the chance is unexpected and random. Therefore, the timing for monitoring the PDCCH is usually configured by the base station with a mini slot, to increase the chance of the base station transmitting the PDCCH, and to increase the chance of the user equipment acquiring the schedule information. However, a duration of the LBT is very short, generally in microseconds. Furthermore, Maximum Channel Occupancy Time (MCOT) after acquiring the chance to transmit the PDCCH is very short, such as 4 milliseconds. Therefore, the base station needs to schedule the user equipment as soon as possible, so as to effectively use the MCOT, and thus maximize the efficiency of a whole system (including a plurality of base stations and a plurality of user equipments). For scheduling the user equipment as soon as possible, the base station generally configures the timing for monitoring the PDCCH at a very high frequency. However, this leads to a negative effect that the user equipment needs to monitor the PDCCH very frequently, and thus leads to a high power consumption of the user equipment. A solution to this problem is to notify the user equipment to start to monitor the PDCCH after the base station successfully acquires the chance to transmit the PDCCH through LBT. However, the user equipment needs to receive this notification very frequently if being notified to monitor the PDCCH, which greatly increases signaling overhead and power consumption of the user equipment.

SUMMARY

Embodiments of the present disclosure provide a method and an apparatus for monitoring a PDCCH, a base station and a user equipment, which facilitates saving signaling overheads and reducing power consumption of the user equipment.

In an embodiment of the present disclosure, a method for monitoring a PDCCH is provided, wherein the method applies to a base station, including configuring an association between a notification signal or signaling and the PDCCH; and transmitting the notification signal or signaling which has the association with the PDCCH to a user equipment, in order to notify the user equipment to start to monitor the PDCCH.

In some embodiments, the PDCCH carries a scheduling information.

In some embodiments, the method for monitoring the PDCCH further includes configuring a transition time for the user equipment, wherein the transition time is a time gap between a time point of receiving the notification signal or signaling and a time point of starting to monitor the PDCCH.

In some embodiments, the transition time is a fixed value; or the transition time is related to capabilities of the user equipment.

In some embodiments, the method for monitoring the PDCCH further includes configuring a duration for the user equipment, wherein the duration is a time gap between a time point of starting to monitor the PDCCH and a time point of stopping monitoring the PDCCH.

In some embodiments, configuring the association between the notification signal or signaling and the PDCCH includes configuring an association between the notification signal or signaling and a search space, wherein the search space includes one or more candidate PDCCHs.

In some embodiments, the notification signal or signaling is a demodulation reference signal of the PDCCH, or the notification signal or signaling is a PDCCH or a search space.

In some embodiments, the notification signal or signaling includes a cell identification (cell ID), a user equipment group identification (UE group ID) or a user equipment identification (UE ID).

In some embodiments, a time domain resource of the notification signal or signaling is fixed as one character.

In some embodiments, the time domain resource of the notification signal or signaling is configured by a slot periodicity and a slot offset; or the time domain resource of the notification signal or signaling is configured by a starting symbol index in a slot.

In some embodiments, a frequency domain resource of the notification signal or signaling is configured by setting a starting physical resource block position or a physical resource block offset.

In some embodiments, the frequency domain resource of the notification signal or signaling is discontinuous; or, the frequency domain resource of the notification signal or signaling is evenly distributed on a plurality of continuous physical resource blocks and occupies a predetermined number of resource elements on each physical resource block.

In some embodiments, the notification signal or signaling is used as a channel state information-reference signal or a tracking reference signal.

In an embodiment of the present disclosure, a method for monitoring a PDCCH is provided, wherein the method applies to a user equipment, including receiving a notification signal or signaling associated to the PDCCH transmitted by a base station; and starting to monitor the PDCCH according to the notification signal or signaling associated to the PDCCH.

In some embodiments, the method for monitoring the PDCCH further includes: receiving a transition time configured by the base station, wherein the transition time is a time gap between a time point of receiving the notification signal or signaling and a time point of starting to monitor the PDCCH; and starting to monitor the PDCCH according to the notification signal or signaling associated to the PDCCH includes: upon receiving the notification signal or signaling associated to the PDCCH, starting to monitor the PDCCH after the transition time.

In some embodiments, before receiving the notification signal or signaling associated to the PDCCH transmitted by the base station, the method for monitoring the PDCCH further includes detecting the notification signal or signaling associated to the PDCCH according to a window length of a detection window configured by the base station.

In some embodiments, before receiving the notification signal or signaling associated to the PDCCH transmitted by the base station, the method for monitoring the PDCCH further includes detecting the notification signal or signaling associated to the PDCCH according to a periodicity and an offset of the detection window configured by the base station.

In an embodiment of the present disclosure, an apparatus for monitoring a PDCCH is provided, wherein the apparatus is located at a base station, including: a first configuration unit, configured to configure an association between a notification signal or signaling and a PDCCH; and a transmitting unit, configured to transmit the notification signal or signaling associated to the PDCCH to a user equipment, in order to notify the user equipment to start to monitor the PDCCH.

In some embodiments, the PDCCH carries a scheduling information.

In some embodiments, the apparatus for monitoring the PDCCH further includes: a second configuration unit, configured to configure a transition time for the user equipment, wherein the transition time is a time gap between a time point of receiving the notification signal or signaling and a time point of starting to monitor the PDCCH.

In some embodiments, the transition time is a fixed value; or the transition time is associated to capabilities of the user equipment.

In some embodiments, the apparatus for monitoring the PDCCH further includes: a third configuration unit, configured to configure a duration for the user equipment to monitor the PDCCH, wherein the duration is a time gap between a time point of starting to monitor the PDCCH and a time point of stopping monitoring the PDCCH.

In some embodiments, the first configuration unit is configured to configure an association between the notification signal or signaling and a search space, wherein the search space includes one or more candidate PDCCHs.

In some embodiments, the notification signal or signaling is a demodulation reference signal of the PDCCH, or the notification signal or signaling is a PDCCH or a search space.

In some embodiments, the notification signal or signaling includes a cell identification (cell ID), a user equipment group identification (UE group ID) or a user equipment identification (UE ID).

In some embodiments, a time domain resource of the notification signal or signaling is fixed as one character.

In some embodiments, the time domain resource of the notification signal or signaling is configured by a slot periodicity and a slot offset; or the time domain resource of the notification signal or signaling is configured by a starting symbol index in a slot.

In some embodiments, a frequency domain resource of the notification signal or signaling is configured by setting a starting physical resource block position or a physical resource block offset.

In some embodiments, the frequency domain resource of the notification signal or signaling is discontinuous; or the frequency domain resource of the notification signal or signaling is evenly distributed on a plurality of continuous physical resource blocks and occupies a predetermined number of resource elements on each physical resource block.

In some embodiments, the notification signal or signaling is used as a channel state information-reference signal or a tracking reference signal.

In an embodiment of the present disclosure, an apparatus for monitoring a PDCCH is provided, wherein the apparatus is located at a user equipment, including: a first receiving unit, configured to receive a notification signal, or signaling associated to the PDCCH transmitted by a base station; and a monitoring unit, configured to start to monitor the PDCCH according to the notification signal or signaling associated to the PDCCH.

In some embodiments, the apparatus for monitoring the PDCCH further includes: a second receiving unit, configured to receive a transition time configured by the base station, wherein the transition time is a time gap between a time point of receiving the notification signal or signaling and a time point of starting to monitor the PDCCH; and the monitoring unit, configured to start to monitor the PDCCH after the transition time upon receiving the notification signal or signaling associated to the PDCCH.

In some embodiments, the apparatus for monitoring the PDCCH further includes: a first detecting unit, configured to detect the notification signal, or signaling associated to the PDCCH according to a window length of a detection window configured by the base station, before the first receiving unit receives the notification signal or signaling associated to the PDCCH transmitted by the base station.

In some embodiments, the apparatus for monitoring the PDCCH further includes: a second detecting unit, configured to detect the notification signal or signaling associated to the PDCCH according to a periodicity and an offset of the detection window configured by the base station, before the first receiving unit receives the notification signal or signaling associated to the PDCCH transmitted by the base station.

In an embodiment of the present disclosure, a base station is provided, wherein the base station includes an apparatus for monitoring a PDCCH located at the base station.

In an embodiment of the present disclosure, a user equipment is provided, wherein the user equipment includes an apparatus for monitoring a PDCCH located at the user equipment.

Embodiments of the present disclosure provide a method, an apparatus, a base station and a user equipment for monitoring a PDCCH, wherein the base station configures an association between a notification signal or signaling and the PDCCH, transmits the notification signal or signaling associated to the PDCCH to the user equipment, and the user equipment starts to monitor the PDCCH after receiving the notification signal or signaling associated to the PDCCH, which facilitates saving signaling overheads and reducing power consumption of the user equipment.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall be within the protection scope of the present invention.

Figure 1:
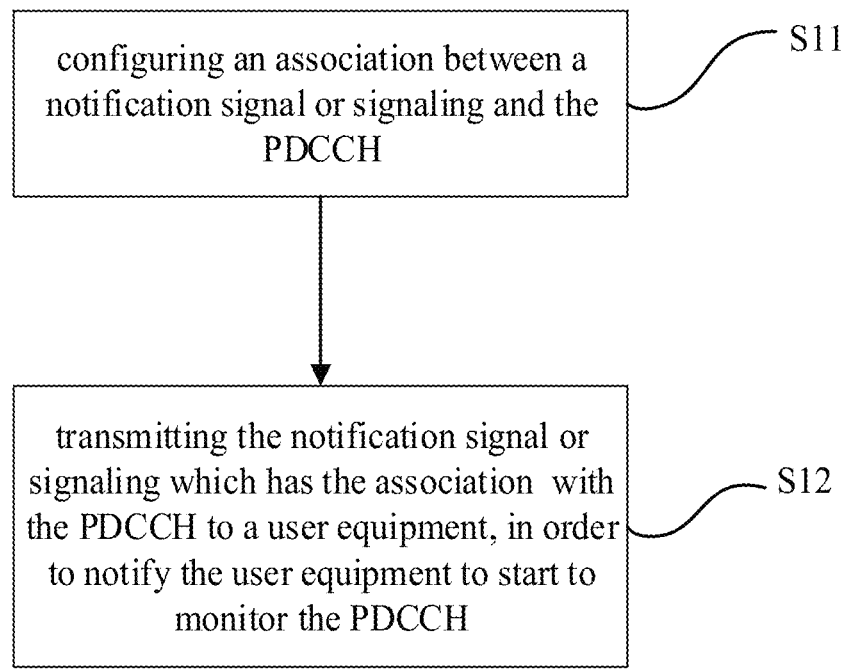
FIG. 1 schematically illustrates a flow chart of a method for monitoring a PDCCH according to an embodiment.

Embodiments of the present disclosure provide a method for monitoring a PDCCH, wherein the method applies to a base station. Referring to FIG. 1, the method includes:

S11, the base station configures an association between a notification signal or signaling and the PDCCH.

In some embodiments, the PDCCH carries a scheduling information.

Specifically, the base station may configure the association between the notification signal or signaling and the PDCCH through configuring an association between the notification signal or signaling and a search space. The search space may include a plurality of candidate PDCCHs, therefore, a plurality of candidate PDCCHs may be associated.

In some embodiment, the notification signal or signaling may be a signal, which can reduce detection complexity.

In some embodiment, the notification signal or signaling may be a Demodulation Reference Signal (DMRS) of the PDCCH; or the notification signal or signaling may be a PDCCH or a search space.

In some embodiment, the notification signal or signaling may be a physical channel, which can reduce detection error rate through coding.

In some embodiment, the notification signal or signaling may be a PDCCH or a search space, wherein the PDCCH or the search space is blind detected fewer times, therefore detection complexity is less than that of monitoring the PDCCH directly.

In some embodiment, the notification signal or signaling may include a cell identification (cell ID), a user equipment group identification (UE group ID) or a user equipment identification (UE ID).

In some embodiment, a time domain resource of the notification signal or signaling may be fixed as one character.

The time domain resource of the notification signal or signaling may be configured by a slot periodicity and a slot offset; or the time domain resource of the notification signal or signaling may be configured by a starting symbol index in a slot.

A frequency domain resource of the notification signal or signaling may be configured by setting a starting Physical Resource Block (PRB) position or a physical resource block offset.

The frequency domain resource of the notification signal or signaling may be discontinuous; or the frequency domain resource of the notification signal or signaling may be evenly distributed on a plurality of continuous physical resource blocks and occupies a predetermined number of Resource Elements (RE) on each physical resource block.

The notification signal or signaling may be used as a Channel State Information-reference Signal (CSI-RS) or a Tracking Reference Signal (TRS). Therefore, system overhead can be reduced.

S12, the base station transmits the notification signal or signaling which has the association with the PDCCH to a user equipment, in order to notify the user equipment to start to monitor the PDCCH.

In an unlicensed band, until a transmitting chance is acquired, the base station starts to transmit a schedule information to the user equipment through the PDCCH, which can reduce power consumption caused by the user equipment frequently monitoring the PDCCH.

Furthermore, the base station may configure a transition time or a time gap for the user equipment, wherein the transition time is a time gap between a time point of receiving the notification signal or signaling and a time point of starting to monitor the PDCCH.

The transition time may be a fixed value; or the transition time may be related to capabilities of the user equipment. When the user equipment reports a high capability, the transition time is short; when the user equipment reports a low capability, the transition time is long. Therefore, system flexibility can be increased.

Furthermore, the base station may configure a duration for the user equipment, wherein the duration is a time gap between a time point of starting to monitor the PDCCH and a time point of stopping monitoring the PDCCH.

After receiving the transition time and the duration configured by the base station and receiving the notification signal or signaling which has the association with the PDCCH, the user equipment starts to monitor the PDCCH after the transition time and stops monitoring the PDCCH after the duration.

In the embodiments of the present disclosure, the method for monitoring the PDCCH is provided, wherein the association between the notification signal or signaling and the PDCCH is configured, and the notification signal or signaling associated to the PDCCH is transmitted to the user equipment. The user equipment starts to monitor the PDCCH after receiving the notification signal or signaling associated to the PDCCH, which facilitates saving signaling overheads and reducing power consumption of the user equipment.

Figure 2:
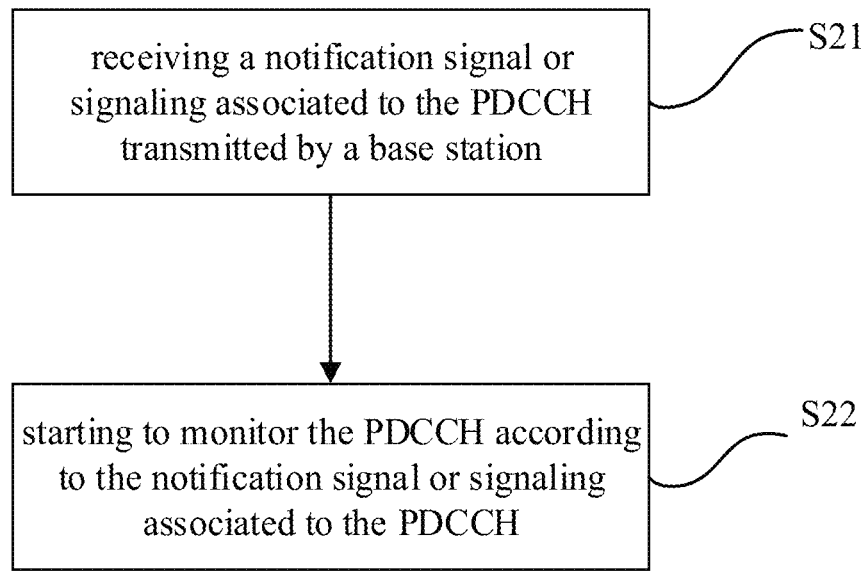
FIG. 2 schematically illustrates a flow chart of a method for monitoring a PDCCH according to another embodiment.

Embodiments of the present disclosure provide a method for monitoring a PDCCH, wherein the method applies to a user equipment. Referring to FIG. 2, the method includes:

S21, the user equipment receives a notification signal or signaling associated to the PDCCH transmitted by a base station.

Further, the base station may configure a window length of a detection window for the user equipment. Before receiving the notification, signal or signaling associated to the PDCCH transmitted by the base station, the user equipment monitors the notification signal or signaling associated to the PDCCH according to the window length of the detection window configured by the base station.

Further, the base station may configure a periodicity and an offset of the detection window for the user equipment. Before receiving the notification, signal or signaling associated to the PDCCH transmitted by the base station, the user equipment monitors the notification signal or signaling associated to the PDCCH according to the periodicity and the offset of the detection window configured by the base station.

S22, the user equipment starts to monitor the PDCCH according to the notification signal or signaling associated to the PDCCH.

Further, the base station may configure a transition time or a time gap for the user equipment, wherein the transition time is a time gap between a time point of receiving the notification signal or signaling and a time point of starting to monitor the PDCCH. The transition time may be a fixed value; or the transition time may be related to capabilities of the user equipment. When the user equipment reports a high capability, the transition time is short; when the user equipment reports a low capability, the transition time is long.

After receiving the transition time configured by the base station and receiving the notification signal or signaling associated to the PDCCH, the user equipment starts to monitor the PDCCH after the transition time.

Further, the base station may configure a duration for the user equipment, wherein the duration is a time gap between a time point of starting to monitor the PDCCH and a time point of stopping monitoring the PDCCH.

After receiving the transition time and the duration configured by the base station, the user equipment starts to monitor the PDCCH after the transition time upon receiving the notification signal or signaling associated to the PDCCH and stops monitoring the PDCCH after the duration.

In the embodiments of the present disclosure, the method for monitoring the PDCCH is provided, wherein the notification signal or signaling associated to the PDCCH is detected. After receiving the notification signal or signaling associated to the PDCCH transmitted by the base station, the user equipment starts to monitor the PDCCH according to the notification signal or signaling associated to the PDCCH, which facilitates saving signaling overheads and reducing power consumption of the user equipment.

Figure 3:
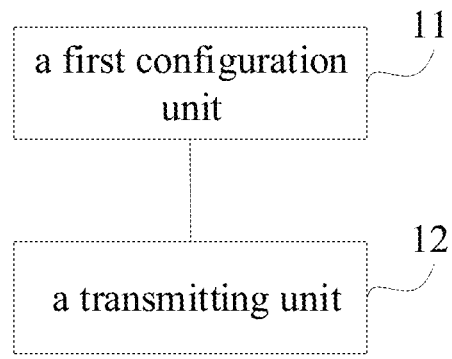
FIGS. 3, FIG. 4 and FIG. 5 schematically illustrate structural diagrams of an apparatus for monitoring a PDCCH located at a base station according to an embodiment.

Embodiments of the present disclosure provide an apparatus for monitoring a PDCCH, wherein the apparatus is located at a base station. Referring to FIG. 3, the apparatus includes: a first configuration unit 11, configured to configure an association between a notification signal or signaling and the PDCCH; and a transmitting unit 12, configured to transmit the notification signal or signaling associated to the PDCCH to a user equipment, in order to notify the user equipment to start to monitor the PDCCH.

In some embodiments, the PDCCH carries a scheduling information.

Figure 4:
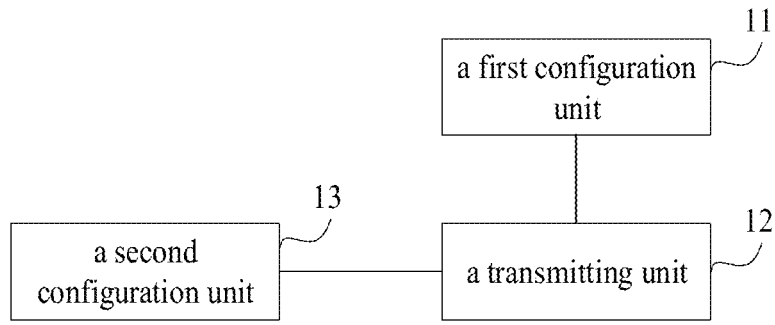

In some embodiments, referring to FIG. 4, the apparatus for monitoring the PDCCH further includes: a second configuration unit 13, configured to configure a transition time for the user equipment, wherein the transition time is a time gap between a time point of receiving the notification signal or signaling and a time point of starting to monitor the PDCCH.

In some embodiments, the transition time is a fixed value; or the transition time is related to capabilities of the user equipment.

Figure 5:
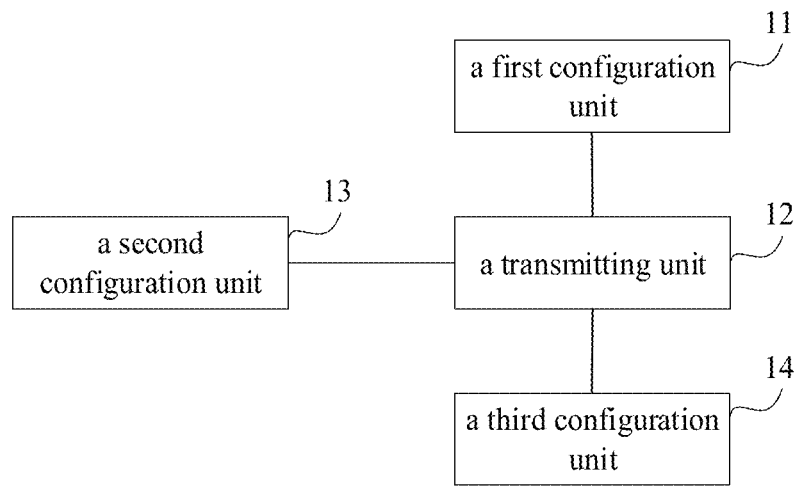

In some embodiments, referring to FIG. 5, the apparatus for monitoring the PDCCH further includes: a third configuration unit 14, configured to configure a duration for the user equipment to monitor the PDCCH, wherein the duration is a time gap between a time point of starting to monitor the PDCCH and a time point of stopping monitoring the PDCCH.

In some embodiments, the first configuration unit, is configured to configure an association between the notification signal or signaling and a search space, wherein the search space includes one or more candidate PDCCHs.

In some embodiments, the notification signal or signaling is a demodulation reference signal of the PDCCH, or the notification signal or signaling is a PDCCH or a search space.

In some embodiments, the notification signal or signaling includes a cell identification (cell ID), a user equipment group identification (UE group ID) or a user equipment identification (UE ID).

In some embodiments, a time domain resource of the notification signal or signaling is fixed as one character.

In some embodiments, the time domain resource of the notification signal or signaling is configured by a slot periodicity and a slot offset; or the time domain resource of the notification signal or signaling is configured by a starting symbol index in a slot.

In some embodiments, a frequency domain resource of the notification signal or signaling is configured by setting a starting physical resource block position or a physical resource block offset.

In some embodiments, the frequency domain resource of the notification signal or signaling is discontinuous; or the frequency domain resource of the notification signal or signaling is evenly distributed on a plurality of continuous physical resource blocks and occupies a predetermined number of resource elements on each physical resource block.

In some embodiments, the notification signal or signaling is used as a channel state information-reference signal or a tracking reference signal.

In the embodiments of the present disclosure, the apparatus for monitoring the PDCCH is provided, wherein the association between the notification signal or signaling and the PDCCH is configured, and the notification signal or signaling associated to the PDCCH is transmitted to the user equipment. The user equipment starts to monitor the PDCCH after receiving the notification signal or signaling associated to the PDCCH, which facilitates saving signaling overheads and reducing power consumption of the user equipment.

The apparatus for monitoring the PDCCH provided in the embodiments described hereinabove can execute the method for monitoring the PDCCH which applies to a base station. An implementation principle and a technical effect of the embodiments are similar to those of the foregoing method embodiments thereof, and details are not repeatedly described herein.

Figure 6:
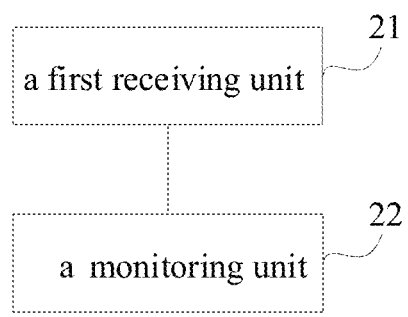
FIGS. 6, FIG. 7, FIG. 8 and FIG. 9 schematically illustrate structural diagrams of an apparatus for monitoring a PDCCH located at a user equipment according to an embodiment.

Embodiments of the present disclosure provide an apparatus for monitoring a PDCCH, wherein the apparatus is located at a user equipment. Referring to FIG. 6, the apparatus includes: a first receiving unit 21, configured to receive a notification signal or signaling associated to the PDCCH transmitted by a base station; and a monitoring unit 22, configured to start to monitor the PDCCH according to the notification signal or signaling associated to the PDCCH.

Figure 7:
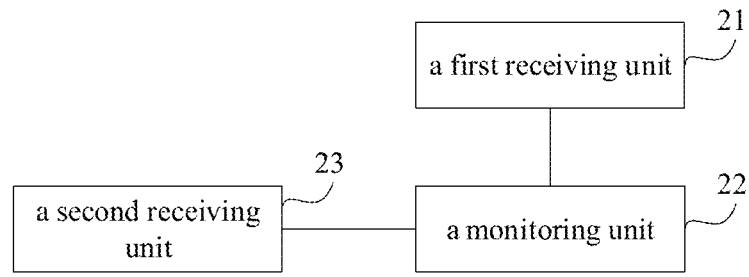

In some embodiments, referring to FIG. 7, the apparatus for monitoring the PDCCH further includes: a second receiving unit 23, configured to receive a transition time configured by the base station, wherein the transition time is a time gap between a time point of receiving the notification signal or signaling and a time point of starting to monitor the PDCCH; and the monitoring unit 22, configured to start to monitor the PDCCH after the transition time upon receiving the notification signal or signaling associated to the PDCCH.

Figure 8:
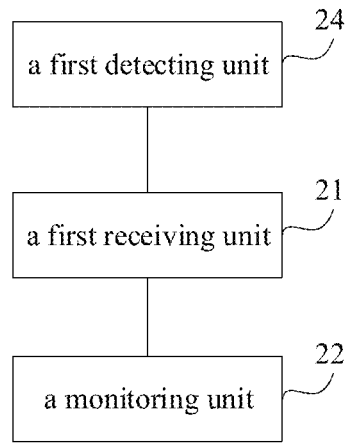

In some embodiments, referring to FIG. 8, the apparatus for monitoring the PDCCH further includes: a first detecting unit 24, configured to detect the notification signal or signaling associated to the PDCCH according to a window length of a detection window configured by the base station, before the first receiving unit 21 receives the notification signal or signaling associated to the PDCCH transmitted by the base station.

Figure 9:
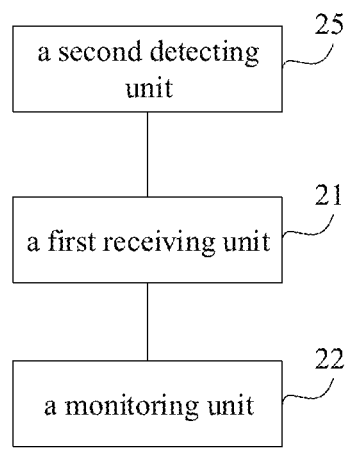

In some embodiments, referring to FIG. 9, the apparatus for monitoring the PDCCH further includes: a second detecting unit 25, configured to detect the notification signal or signaling associated to the PDCCH according to a periodicity and an offset of the detection window configured by the base station, before the first receiving unit 21 receives the notification signal or signaling associated to the PDCCH transmitted by the base station.

In the embodiments of the present disclosure, the apparatus for monitoring the PDCCH is provided, wherein the notification signal or signaling associated to the PDCCH is detected. After receiving the notification signal or signaling associated to the PDCCH transmitted by the base station, the user equipment starts to monitor the PDCCH according to the notification signal or signaling associated to the PDCCH, which facilitates saving signaling overheads and reducing power consumption of the user equipment.

The apparatus for monitoring the PDCCH provided in the embodiments described above can execute the method for monitoring the PDCCH which applies to a user equipment. An implementation principle and a technical effect of the embodiments are similar to those of the foregoing method embodiments thereof, and details are not repeatedly described herein.

In an embodiment of the present disclosure, a base station is provided, wherein the base station includes an apparatus for monitoring a PDCCH located at the base station.

In an embodiment of the present disclosure, a user equipment is provided, wherein the user equipment includes an apparatus for monitoring a PDCCH located at the user equipment.

In the embodiments of the present disclosure described above, the notification signal or signaling may also be called a wake-up signal or signaling, or other names with similar meaning. All other embodiments obtained by replacing the notification signal or signaling with other similar names shall be within the protection scope of the present invention.

Those skilled in the art can understand that a part or all of the methods described in the embodiments of the present disclosure can be performed by a computer program instructing a related hardware. The computer program can be stored in a computer-readable storage medium, and when the computer program is executed, the computer program can include processes of the foregoing methods described in the embodiment. The storage medium may be a magnetic disk, an optical disk, a Read-Only Memory (ROM), or a Random Access Memory (RAM), etc.

Although the present disclosure has been disclosed above with reference to preferred embodiments thereof, it should be understood that the disclosure is presented by way of example only, and not limitation. Those skilled in the art can modify and vary the embodiments without departing from the spirit and scope of the present disclosure.

What is claimed is:

1. A method for monitoring a Physical Downlink Control Channel (PDCCH), wherein the method applies to a base station and comprises:
   configuring an association between a notification signal or signaling and the PDCCH, wherein the notification signal or signaling comprises a user equipment group identification; and
   transmitting the notification signal or signaling to a user equipment, in order to notify the user equipment to start to monitor the PDCCH;
   wherein the method further comprises: configuring a time gap for the user equipment, wherein the time gap is from a time point of receiving the notification signal or signaling to a time point of starting to monitor the PDCCH.

2. The method according to claim 1, wherein the PDCCH carries a scheduling information.

3. The method according to claim 1, wherein the time gap is a fixed value; or the time gap is related to capabilities of the user equipment.

4. The method according to claim 1, wherein the method further comprises:
   configuring a duration for the user equipment, wherein the duration is a time gap between a time point of starting to monitor the PDCCH and a time point of stopping monitoring the PDCCH.

5. The method according to claim 1, wherein configuring the association between the notification signal or signaling and the PDCCH comprises:
   configuring an association between the notification signal or signaling and a search space, wherein the search space comprises one or more candidate PDCCHs.

6. The method according to claim 1, wherein a time domain resource of the notification signal or signaling is fixed as one character.

7. The method according to claim 1, wherein a time domain resource of the notification signal or signaling is configured by a slot periodicity and a slot offset; or, the time domain resource of the notification signal or signaling is configured by a starting symbol index in a slot.

8. The method according to claim 1, wherein a frequency domain resource of the notification signal or signaling is configured by setting a starting physical resource block position or a physical resource block offset.

9. The method according to claim 1, wherein a frequency domain resource of the notification signal or signaling is discontinuous; or, the frequency domain resource of the notification signal or signaling is evenly distributed on a plurality of continuous physical resource blocks and occupies a predetermined number of resource elements on each physical resource block.

10. The method according to claim 1, wherein the notification signal or signaling is used as a channel state information-reference signal or a tracking reference signal.

11. A method for monitoring a Physical Downlink Control Channel (PDCCH), wherein the method applies to a user equipment and comprises:
    receiving a notification signal or signaling transmitted by a base station, wherein the notification signal or signaling comprises a user equipment group identification; and
    starting to monitor the PDCCH according to the notification signal or signaling;
    wherein the method further comprises: receiving a time gap configured by the base station, wherein the time gap is from a time point of receiving the notification signal or signaling to a time point of starting to monitor the PDCCH.

12. The method according to claim 11, wherein the method further comprises:
   starting to monitor the PDCCH according to the notification signal or signaling comprises: upon receiving the notification signal or signaling, starting to monitor the PDCCH after the time gap.

13. The method according to claim 12, wherein the method for monitoring the PDCCH further comprises:
   receiving a duration configured by the base station, wherein the duration is a time gap between a time point of starting to monitor the PDCCH and a time point of stopping monitoring the PDCCH.

14. The method according to claim 13, wherein the method for monitoring the PDCCH further comprises:
   stopping monitoring the PDCCH after the duration.

15. The method according to claim 11, wherein before receiving the notification signal or signaling transmitted by the base station, the method for monitoring the PDCCH further comprises:
   detecting the notification signal or signaling according to a window length of a detection window configured by the base station.

16. The method according to claim 11, wherein before receiving the notification signal or signaling transmitted by the base station, the method for monitoring the PDCCH further comprises:
   detecting the notification signal or signaling according to a periodicity and an offset of the detection window configured by the base station.

17. A base station, comprising a memory and a processor, wherein the memory stores one or more programs, the one or more programs comprising computer instructions, which, when executed by the processor, cause the processor to:
   configure an association between a notification signal or signaling and a Physical Downlink Control Channel (PDCCH), wherein the notification signal or signaling comprises a user equipment group identification; and
   transmit the notification signal or signaling to a user equipment, in order to notify the user equipment to start to monitor the PDCCH;
   wherein the processor is further caused to: configure a time gap for the user equipment, wherein the time gap is from a time point of receiving the notification signal or signaling to a time point of starting to monitor the PDCCH.

18. The base station according to claim 17, wherein the PDCCH carries a scheduling information.

* * * * *